April 24, 1928.  J. A. RUZALSKI  1,667,708
WEEDING MACHINE
Filed June 21, 1926  2 Sheets-Sheet 1

INVENTOR
J. A. Ruzalski
By E. J. Fetherstonhaugh
ATTY

April 24, 1928.　　　　J. A. RUZALSKI　　　　1,667,708
WEEDING MACHINE
Filed June 21, 1926　　2 Sheets-Sheet 2
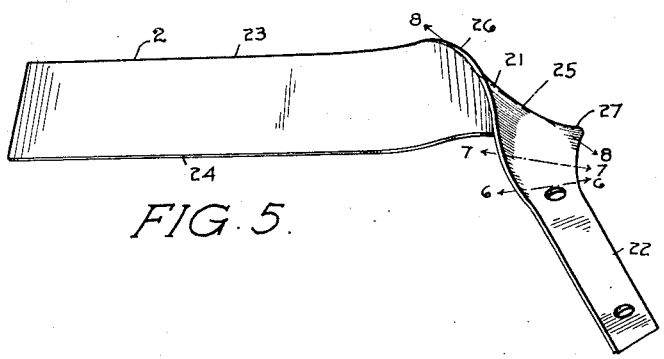
FIG. 5.
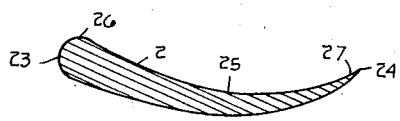
FIG. 6.
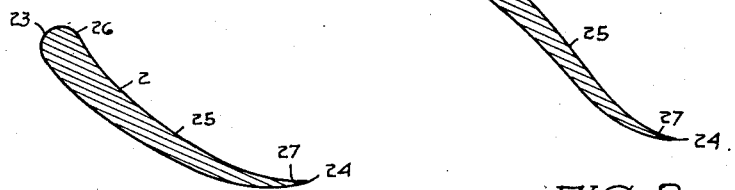
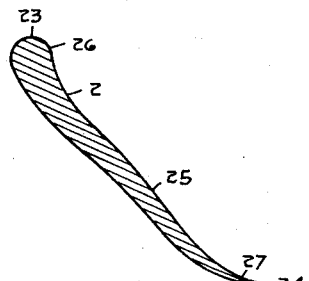
FIG. 7.　　　　FIG. 8.
INVENTOR
J. A. Ruzalski
By E. J. Featherstonhaugh
ATTY.

Patented Apr. 24, 1928.

1,667,708

UNITED STATES PATENT OFFICE.

JOSEPH ANTON RUZALSKI, OF BLACKIE, ALBERTA, CANADA.

WEEDING MACHINE.

Application filed June 21, 1926. Serial No. 117,375.

The invention relates to a weeding machine, as described in the present specification and illustrated in the accompanying drawings that form part of the same.

The invention consists essentially of the novel features of construction pointed out broadly and specifically in the claim for novelty following a description containing an explanation in detail of an acceptable form of the invention.

The objects of the invention are to facilitate the removal of weeds from fields, utilized in the cultivation of various plants; to minimize the number of parts in such devices; to insure the passage of stones and like obstructions through the digging members and thereby avoid choking; to effectually uproot the weeds and land them on the surface of the ground; to eliminate much of the cost of maintenance in such machines by the avoidance of frequent repairs necessary in more complicated mechanisms; and generally to provide a simple, durable, and efficient machine for the aforesaid purposes, economical in regard to its cost and serviceable in regard to use.

In the drawings, Figure 1 is a plan view of the frame and weeding blades broken away.

Figure 5 is a perspective detail of a blade.

Figure 6 is a cross sectional view on the line 6—6 in Figure 5.

Figure 7 is a cross sectional view on the line 7—7 in Figure 5.

Figure 8 is a cross sectional view on the line 8—8 in Figure 5.

Like numerals of reference indicate corresponding parts in the various figures.

Figure 1:
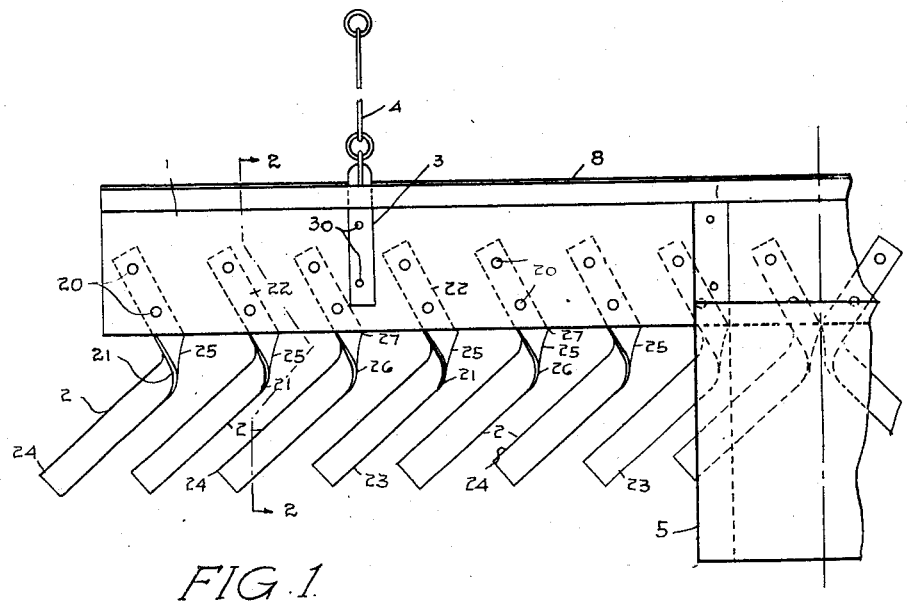
Figure 2:
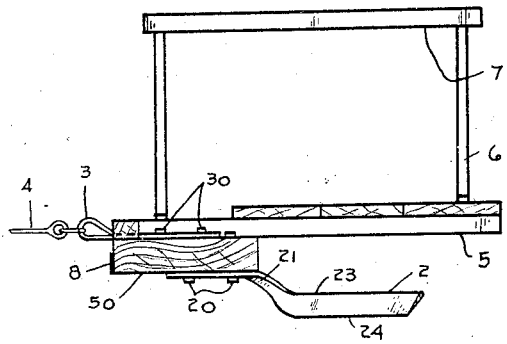
Figure 2 is a cross sectional view on the line 2—2 in Figure 1.
Figure 3:
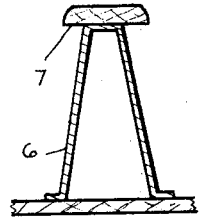
Figure 3 is a cross sectional view of the seat.
Figure 4:
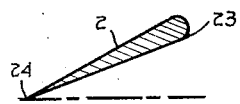
Figure 4 is a sectional detail of a blade.

Referring to the drawings, the frame 1 is formed of a heavy transverse beam or beams and to the bottom of this frame the shanks of the blades 2 are rigidly secured by the bolts 20.

The twist 21 in the bars forming the blades 2 divides the blades 2 and shanks 22, and forms a spiral knife blade with a recessed back 25 producing the shedding surfaces 26 and 27 that will insure the clearing of the blade face from accumulations of earth, as the blade at the twist functions to some extent as a suction cup for drawing the earth from the front to the rear.

The blades 2 for one half of the frame extend outwardly therefrom in an oblique direction in relation thereto and for the other half the blades extend in an opposite direction outwardly from the centre.

The blades 2 are inclined downwardly and are parallel while the shanks 22 are parallel on the frame 1, therefore each digging knife with its shank forms an angle bar in which the surface of the sections respectively are at variance in regard to their planes.

The riding platform 5 extends rearwardly from the frame 1 and is supported on the beams 50 secured by the bolts 30 to the frame 1 and on this platform the seat or saddle 7 is mounted being supported by the brackets 6.

The front of the frame 1 is bound by the metal strap 8 and the draw bars 4 extend from the eye-plate 3 secured by the bolts 30 to the said frame 1.

It will be noticed that the blades 2 at the twist 21 have also a cutting edge, therefore as it is drawn at a good speed through the earth the backward curve towards the edges materially assists in creating the suction hereinbefore mentioned to draw the earth away from the front of the bend.

The machine is here shown as hauled by means of the draw bars 4 but it will readily be understood that other means may be employed.

In the use of this implement the frame 1 is drawn along the ground, which is entered by the blades 2, these blades digging into the earth and unearthing the weeds and laying them on the land and at the same time clearing itself automatically of the earth accumulations.

The blade in cross section tapers from the round back 23 to the cutting edge 24.

What I claim is:—

In a weeding machine, a plurality of knives, each knife having a comparatively narrow shank broadening into a bend forming the beginning of the blade and in cross section shaped to taper from a thick rounded back to a cutting edge, said bend forming a twist in the metal from which the continuation of the blade extends at an obtuse angle to said shank, said twist transversely curving from the rounded back to the cutting edge, this curve gradually decreasing in sharpness and reversing across the central portion of the bend and forming thereacross and thereunder a recessed surface merging into a flat though tapered extension forming the main cutting portion.

JOSEPH ANTON RUZALSKI.